May 31, 1932.  H. M. HUFFMAN  1,861,409
MEASURING RECEPTACLE
Filed Jan. 24, 1929
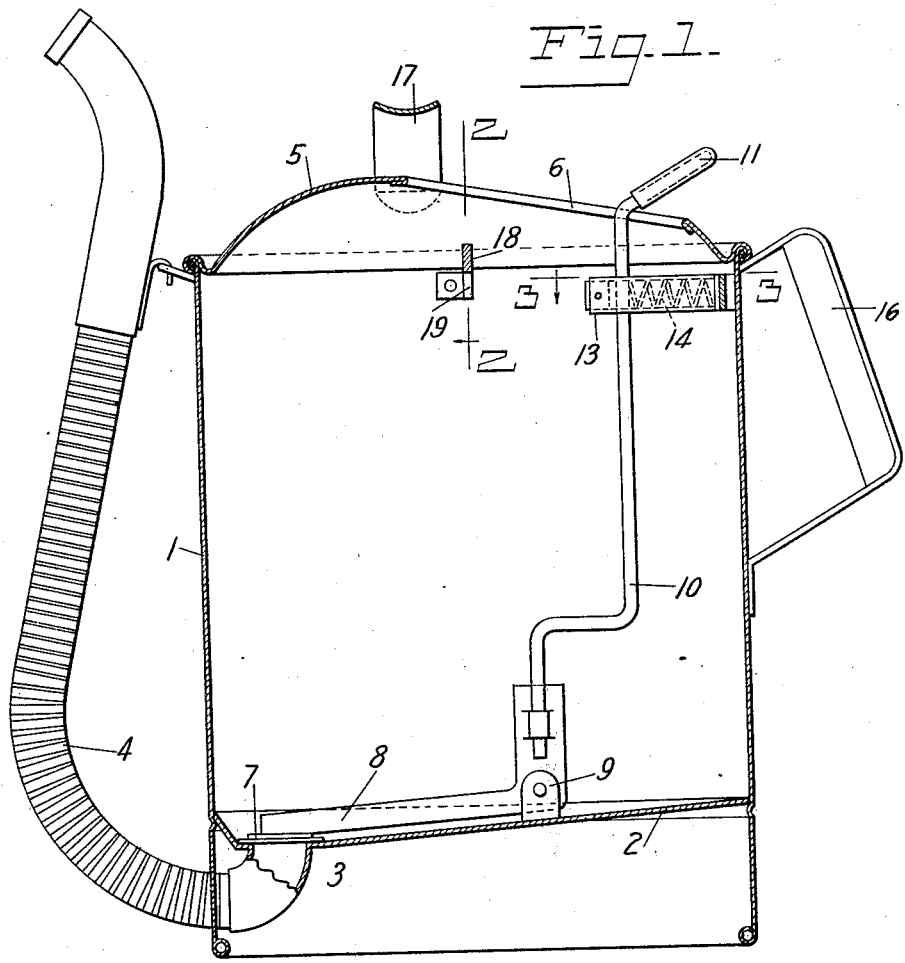
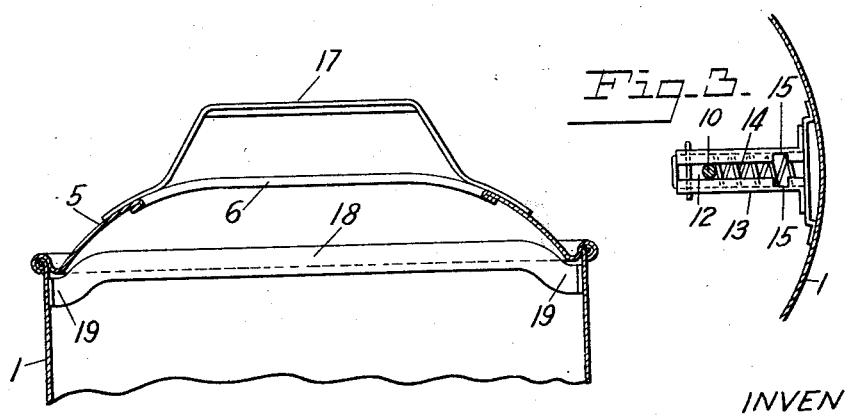
INVENTOR.
HORACE M. HUFFMAN.
by
his ATTORNEY.

Patented May 31, 1932

1,861,409

UNITED STATES PATENT OFFICE

HORACE M. HUFFMAN, OF DAYTON, OHIO, ASSIGNOR TO THE HUFFMAN MANUFACTURING COMPANY, OF DAYTON, OHIO, A CORPORATION OF OHIO

MEASURING RECEPTACLE

Application filed January 24, 1929. Serial No. 334,668.

This invention relates to a measuring receptacle for filling the crank cases of automobiles and for like purposes.

It has been customary heretofore to deliver small quantities of oil to the crank case of an automobile, for the purpose of replenishing the supply of oil, either from bottles each containing a quart of oil or from comparatively small measuring receptacles. These measuring receptacles are of such size that one of them, when full, can easily be handled with one hand and each receptacle has a swinging spout communicating with an outlet in the bottom thereof. The flow of oil through this outlet is controlled by a valve provided with an actuating device having a part arranged adjacent to the handle of the receptacle so that it can be manipulated by the hand which supports the receptacle. When the crank case of an automobile is drained and completely refilled it has been customary either to use two or three small receptacles or to refill one receptacle two or three times, or to use a single large receptacle which is tilted to discharge the oil through a spout at the top thereof. Either method is inconvenient and is of such a character as to cause a likelihood of spilling a part of the oil. A receptacle for filling a crank case must usually contain from five to eight quarts of oil and the weight is such that it cannot be handled or manipulated in the manner in which the smaller receptacles are handled.

One object of the present invention is to provide a large capacity measuring receptacle having means whereby it can be easily handled and the discharge of the oil therefrom easily controlled.

A further object of the invention is to provide improved means to indicate the level to which the receptacle must be filled in order to contain the desired quantity of oil.

A further object of the invention is to provide a valve actuating device adapted for use with a receptacle of this kind.

Other objects of the invention will appear as the device is described in detail.

In the accompanying drawings Fig. 1 is a vertical sectional view taken through an oil measure embodying my invention; Fig. 2 is a section taken through the upper part of such a receptacle on the line 2—2 of Fig. 1; and Fig. 3 is a section taken on the line 3—3 of Fig. 1.

In these drawings I have illustrated one embodiment of my invention but it will be understood that this particular embodiment has been chosen for the purposes of illustration only and that the device may take various forms without departing from the spirit of the invention.

In that embodiment of the invention here illustrated the measuring receptacle comprises a body portion 1 which is preferably cylindrical in form and is provided with a bottom wall 2 spaced a short distance above the bottom of the cylindrical part of the receptacle, sloped forwardly and provided with an outlet 3 in the forward portion thereof. That part of the cylindrical wall which extends below the bottom constitutes a support upon which the receptacle may rest. Connected with the outlet 3 is a swinging spout, here shown as a flexible spout 4 which extends through an opening in the depending portion or skirt of the cylindrical wall.

The cylindrical body portion is provided at its upper end with a dome-shaped top wall 5 having therein a relatively large opening 6 through which the receptacle may be filled and through which its contents may be inspected, more particularly for determining the level of the oil therein. The filling and inspection opening 6 is here shown as eccentrically arranged and located somewhat nearer the rear side of the receptacle than the front side. This opening imparts to the top wall the characteristics of an inwardly extending flange, the forward portion of which is somewhat wider than the rear portion. This flange constitutes an anti-splash guard which prevents the spilling of the oil when the receptacle is being carried from one place to another, or if tilted while discharging its contents.

The discharge of the oil through the outlet 3 is controlled by a valve 7 which, as here shown, is carried by the free end of a lever 8 which is pivotally mounted on lugs 9 supported by the bottom wall 2 of the receptacle.

Rigidly connected with this lever and extending upwardly therefrom is an actuating rod 10, the upper portion of which is offset rearwardly and extends through the filling and inspection opening 6 in the top wall. The rod or arm 10 is provided above the top wall 5 with a thumb piece 11 by means of which it may be manipulated. It will be apparent that a downward and rearward pressure on the thumb piece 11 will rock the lever 8 about its axis and move the valve 7 to its open position. The actuating rod or arm 10 preferably extends through a slot 12 in a horizontal guide 13 which is rigidly secured to and extends forwardly from the rear side of the receptacle. A spring 14 acts on the rod 10 to move the same forwardly and thus press the valve normally on its seat. The guide 13 is provided on one or both sides of the slot 12 and near the outer end thereof with recesses 15 into which the actuating rod 10 may be moved to lock the valve in its open position.

Rigidly secured to the rear side of the receptacle, near the top thereof, is a handle 16 which is so positioned with relation to the actuating rod 10 that the thumb piece 11 thereof may be engaged and actuated by the thumb of the hand which grasps the handle 16. Because of the large quantity of liquid contained in the receptacle the weight is so great that the receptacle cannot be handled or manipulated by the handle 16 alone. I have therefore provided the receptacle with a second handle 17 arranged above the top wall 5 and some distance in front of the handle 16. In the present instance, the handle 17 is rigidly secured to the top wall or anti-splash flange 5. The handles 16 and 17 are so arranged with relation one to the other and with relation to the valve actuating device that an operator may grasp one handle in each hand and thus easily lift and manipulate the filled receptacle and at the same time may manipulate the valve by engaging the thumb piece 11 with the thumb of the hand that grasps the handle 16. In this manner a measuring receptacle having a capacity sufficient to completely fill a crank case may be very easily handled and manipulated by the operator.

Means are arranged within the receptacle to define the measuring line, that is, to indicate the level to which the receptacle must be filled in order to contain the desired quantity of oil. This indicating device is preferably in the form of a bar extending across the interior of the receptacle beneath the filling and inspection opening 6. The top wall 5, as here shown, has an annular portion which extends into the upper end of the cylindrical wall or body portion 1 of the receptacle, this being for the purpose of providing a strong leak proof joint between the top wall and the side wall. The top wall is preferably a stamping but in seaming the same to the body portion the shape and depression of the annular portion thereof may sometimes be varied or distorted. While this variation is of minor extent it would, nevertheless, result in a variation of the quantity of the liquid if the measuring line was placed above that portion of the top wall which extends into the cylindrical body portion of the receptacle. Therefore, the measuring bar is so arranged that the operative edge or measuring line thereof will always be below the lowest portion of the top wall. It is also preferable that the measuring bar should be arranged edgewise in the receptacle to avoid the possibility of it being sprung downwardly or upwardly, thus inaccurately indicating the measuring line. To avoid placing the measuring line too far from the top of the receptacle I have so constructed the measuring bar that it will extend into the dome-shaped top wall but will have its lower edge so arranged that it will always be below the lowest portion of the top wall regardless of any variation in the shape of the top wall. It will be understood, of course, that the measuring bar is secured in place within the body portion of the receptacle before the top wall is secured thereto. As here shown, the measuring bar comprises an intermediate portion 18 having downturned end portions 19 which are rigidly secured to the cylindrical wall of the receptacle on opposite sides of the body portion thereof. The ends of this bar are secured to the side wall just below the top wall and the intermediate portion 18 extends upwardly into the top wall but is of such a width that its lower edge, which constitutes the measuring line, is spaced below the lowest portion of the top wall. In this manner the measuring line is brought close to the top where it can be readily seen but will be below the top wall regardless of any variations therein.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an oil measuring receptacle for filling the crank cases of automobiles and the like, a body portion having an outlet at the bottom thereof, a swinging spout connected with said outlet, a valve to control the flow of oil through said outlet, an actuating device operatively connected with said valve and having an operating part at the top and near the rear side of said body portion, a flange extending inwardly from the upper edge of said body portion and constituting an anti-splash guard, a measuring bar having its ends secured to the vertical wall of said body portion and having its level indicating edge below the lowest portion of said flange, a handle secured to said flange and arranged above said body portion, and a handle secured to the rear side of said body portion near the top thereof and so arranged that an operator may grasp said rear handle and operate said valve actuating device with one hand while he grasps the first mentioned handle with his other hand to support said receptacle.

2. In an oil measuring receptacle for filling the crank cases of automobiles and the like, a body portion having an outlet at the bottom thereof, a swinging spout connected with said outlet, a valve to control the flow of oil through said outlet, said body portion having a dome-shaped top wall provided with a filling and inspection opening, a measuring bar secured to the side wall of said body portion and having a part extending into the dome-shaped chamber in said top wall, the lower edge of said bar being arranged below the lowest portion of said top wall, a valve actuating device operatively connected with said valve and having an operating part extending through the opening in said top wall, a handle secured to the rear side of said body portion near the top thereof, and a second handle secured to said body portion and arranged above said top wall, said handles being so arranged that an operator may grasp one handle in each hand and operate said valve actuating device with the hand that grasps one of said handles.

3. In an oil measuring receptacle for filling the crank cases of automobiles and the like, a body portion having a bottom wall and a dome-shaped top wall, said top wall having a filling and inspection opening, said bottom wall having an outlet, a swinging spout connected with said outlet, a valve to control the flow of oil through said outlet, a device to actuate said valve, a handle secured to said body portion and so arranged that said valve actuating device may be operated by the hand which grasps said handle, and a measuring bar comprising a horizontal intermediate portion arranged within said top wall, and down turned end portions secured to the side walls of said body portion below said top wall, the lower edge of said intermediate portion being below the lowest portion of said top wall.

4. In an oil measuring receptacle for filling the crank cases of automobiles and the like, a body portion having an outlet at the bottom thereof, a swinging spout connected with said outlet, a valve to control the flow of oil through said outlet, a lever pivotally mounted within said body portion and connected with said valve, an actuating rod connected with said lever, extending upwardly therefrom movable transversely to its length to actuate said lever, said rod having a rearwardly offset portion extending above the top of said body portion, a spring acting on said rod to hold said valve normally in its closed position, and a handle secured to the rear side of said body portion near the top thereof and so arranged that said actuating rod may be operated by the hand which grasps said handle.

5. In an oil measuring receptacle for filling the crank cases of automobiles and the like, a body portion having an outlet at the bottom thereof, a swinging spout connected with said outlet, a valve to control the flow of oil through said outlet, a lever pivotally mounted within said body portion and connected with said valve, an actuating rod connected with said lever extending upwardly therefrom and movable transversely to its length to actuate said lever, a substantially horizontal guide having a slot in which said rod moves and having a lateral recess near one end of said slot to receive said rod and lock said valve in its open position, a spring acting on said rod to move said valve to its closed position, and a handle secured to the rear side of said body portion near the top thereof and so arranged that said actuating rod may be operated by the hand which grasps said handle.

6. In a receptacle for filling crank cases of automobiles and the like, a body portion having a bottom wall provided with an outlet, a swinging spout connected with said outlet, a valve to control the flow of oil through said outlet, a lever pivotally mounted on said bottom wall within said body portion and connected with said valve, an actuating rod rigidly secured to said lever for transverse movement about the axis of said lever, said rod extending to a point near the top of said body portion and having a part to be engaged by the hand of the operator, a spring acting on said rod to hold said valve normally in its closed position, and a handle secured to the rear side of said body and so arranged that said actuating rod may be operated by the hand which grasps said handle.

7. In a receptacle for filling crank cases of automobiles and the like, a body portion having a bottom wall provided with an outlet, a swinging spout connected with said outlet, a valve to control the flow of oil through said outlet, a lever pivotally mounted on said bottom wall within said body portion and connected with said valve, an actuating rod rigidly secured to said lever for transverse movement about the axis of said lever, said rod extending to a point near the top of said body portion and having a part to be engaged by the hand of the operator, a fixed guide secured to the upper part of said body portion, extending transversely to said body portion and having a slot through which said rod extends, a spring acting on said rod to hold the same normally at the inner end of said slot, and a handle secured to the rear side of said body portion and so arranged that said actuating rod may be operated by the hand which grasps said handle.

8. In an oil measuring receptacle for filling the crank cases of automobiles and the like, a body portion having an outlet at the bottom thereof, a swinging spout connected with said outlet, a valve to control the flow of oil through said outlet, an actuating device operatively connected with said valve and having an operating part at the top and near the rear side of said body portion, a flange extending inwardly from the upper edge of said body portion and constituting an anti-splash guard, a fixed measuring member having a level indicating edge in the plane of or below the lowest portion of said flange, a handle secured to said flange and arranged above said body portion and a handle secured to the rear side of said body portion near the top thereof and so arranged that an operator may grasp said rear handle and operate said valve actuating device with one hand while he grasps the first mentioned handle with his other hand to support said receptacle.

9. In an oil measuring receptacle for filling the crank case of automobiles and the like, a body portion having an outlet at the bottom thereof, a swinging spout connected with said outlet, a valve to control the flow of oil through said outlet, an actuating device operatively connected with said valve and having an operating part at the top and near the rear side of said body portion, an anti-splash guard secured to the upper edge of said body portion, a fixed measuring member extending transversely to said body portion and having a level indicating portion arranged in or below the plane of the lowest portion of said guard, a handle secured to said receptacle and extending above said guard, and a handle secured to the rear portion of said body portion near the top thereof and so arranged that an operator may grasp said rear handle and operate said valve actuating device with one hand while he grasps the first mentioned handle with his other hand to support said receptacle.

10. In an oil measuring receptacle for filling the crank cases of automobiles and the like, a body portion having an outlet at the bottom thereof, a swinging spout connected with said outlet, a valve to control the flow of oil through said outlet, an actuating device operatively connected with said valve and having an operating part at the top and near the rear side of said body portion, a flange extending inwardly from the upper edge of said body portion and constituting an anti-splash guard, the distance between the opposite inner edges of said guard being less than the width of said body portion, a fixed measuring member extending transversely to said body portion beneath the opening in said guard and having a level indicating portion arranged in or slightly below the plane of the lowermost portion of said guard, a handle secured to the rear side of said body portion near the top thereof and so arranged that an operator may grasp said rear handle and operate said valve actuating device with one hand while he grasps the first mentioned handle with his other hand to support said receptacle.

In testimony whereof, I affix my signature hereto.

HORACE M. HUFFMAN.